Figure 1:
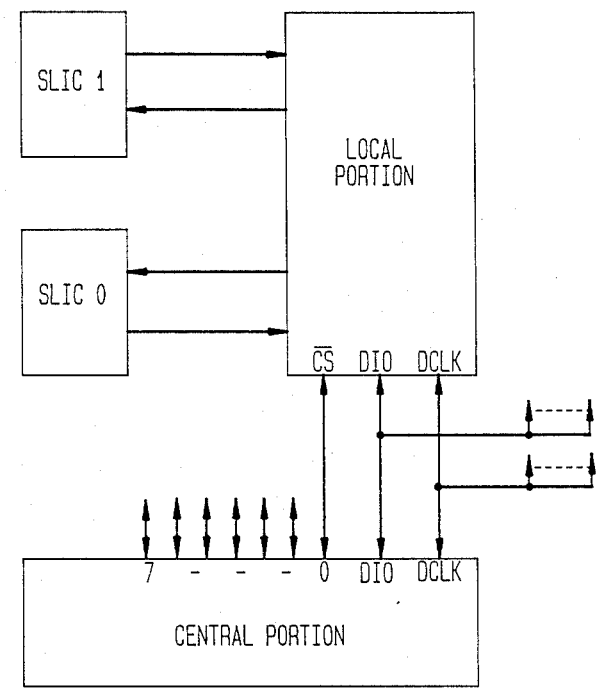

United States Patent [19]
Rudolf et al.

[11] Patent Number: 4,858,226
[45] Date of Patent: Aug. 15, 1989

[54] METHOD FOR THE OPERATION OF AN INTERFACE CIRCUIT BETWEEN A CENTRAL PORTION AND LOCAL PORTIONS OF A SUBSCRIBER TERMINATION MODULE OF A DIGITAL TIME MULTIPLEX TELECOMMUNICATIONS NETWORK

[75] Inventors: Hans-Werner Rudolf; Harald Stader; Norbert Wingerath, all of Munich, Fed. Rep. of Germany; Robert Lechner, St. Poelten, Austria

[73] Assignee: Siemens Aktiengesellschaft, Berlin and Munich, Fed. Rep. of Germany

[21] Appl. No.: 101,112

[22] Filed: Sep. 25, 1987

[30] Foreign Application Priority Data

Sep. 29, 1986 [DE] Fed. Rep. of Germany ....... 3633000

[51] Int. Cl.⁴ .............................................. H04J 3/02
[52] U.S. Cl. .................................................... 370/58
[58] Field of Search ..................... 370/58, 66, 68, 68.1

[56] References Cited

U.S. PATENT DOCUMENTS 4,621,357 11/1986 Naiman et al. ........................ 370/58
4,641,301 2/1987 Van Simaeys et al. ............... 370/58

OTHER PUBLICATIONS

Saitoh et al., "A Large Size Routing Switcher for Television Broadcasting Stations", NEC Res. 2 Dev. (Japan) No. 6, Jan. 1981.

Primary Examiner—Douglas W. Olms
Assistant Examiner—Min Jung
Attorney, Agent, or Firm—Adel A. Ahmed

[57] ABSTRACT

In a subscriber termination module for coupling a plurality of subscriber termination lines of a digital time multiplex telecommunications network, lines coupling a central portion and local portions individually allocated to at least one subscriber termination line are selectably utilized for the transmission of status setting information to the local portions for setting different operating conditions and for serial transmission, that is, successive transmission of information to be supplied to the individual local portions as well as for simultaneous information transmission from the local portions to the central portion, that is, parallel information transmission.

2 Claims, 2 Drawing Sheets

METHOD FOR THE OPERATION OF AN INTERFACE CIRCUIT BETWEEN A CENTRAL PORTION AND LOCAL PORTIONS OF A SUBSCRIBER TERMINATION MODULE OF A DIGITAL TIME MULTIPLEX TELECOMMUNICATIONS NETWORK

The present invention relates to a method for the operation of interface circuits between a central portion and local portions of a subscriber termination module of a digital time multiplex telecommunications network.

Such interfaces play a roll particularly in integrated services telecommunication systems in which speech as well as data signals are transmitted. In the subscriber termination modules of such telecommunication systems, special components are included as local portions which in turn are allocated to at least one terminal equipment, and cooperate with a central control as a central portion. A subscriber termination module comprises, for example, eight such special components, which are respectively responsible for two subscriber termination ports. Between such components and the central control are, on the one hand, setting information to be transmitted from the central control to the component, and on the other hand status signals to be transmitted from the components to the central control with regard to the subscriber termination lines of the subscriber termination ports.

In the case of a known architecture of this kind, the interfaces between the central portion and local portions are formed by line groups in which the lines by way of which the setting information is transmitted to the local portions are separated from the lines on which status information reaches the central portion from the local portions.

A task of the invention is to provide a method which allows a reduction in the expenditure of lines and makes possible servicing of the individual local portions by the central portion with as few instruction cycles as possible wherein all local portions are monitored simultaneously for better dynamic use of the central portion.

In accordance with a method of the kind referred to above, which in accordance with the invention is characterized in that the lines coupling the central portion and the local portions are selectively utilized on the one hand for the transmission of information from the central portion to a respective local portion and on the other hand for the transmission of information provided by the local portions simultaneously to the central portion as well as for the status setting information to be supplied to the same extent by the central portion to the local portions, in that for a serial information transmission in which the central portion successively provides information to the local portions, of the said lines such as are allocated to the individual local portions, for the selection of the local portion and such as are jointly provided for the local portions are utilized for this serial information transmission, and for a parallel information transmission in which the local portions simultaneously provide the same type of information to the central portion the lines jointly provided for the transmission of status setting information to the local portions and the individually provided lines are utilized for the transmission of the said same type of information to the central portion.

In accordance with a further embodiment of the invention the setting information transmitted by way of the joint lines to the local portions respectively appears in the form of combinations of distinguishable line status on the totality of this line taking into consideration the succession of the occurrence of line status change in the generation of these line status. It is thereby possible to transmit more distinguishable setting information than corresponds to the number of lines provided.

Figure 2:
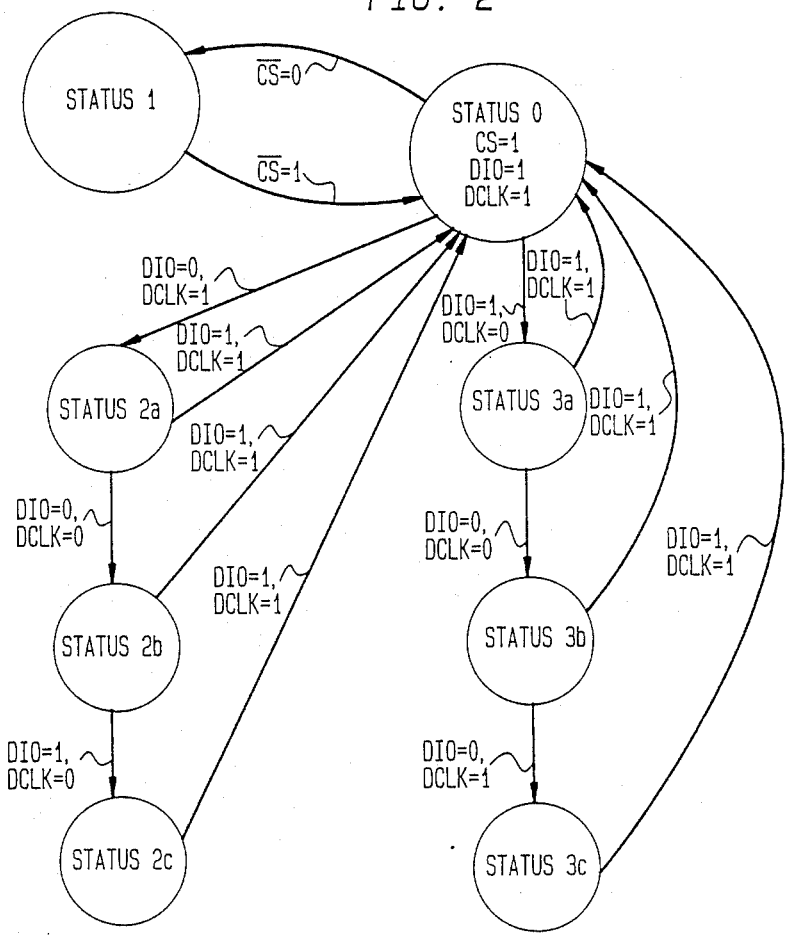

In the following, the invention will be described in greater detail by way of an exemplary embodiment with the aid of the drawings in which FIG. 1 shows a block schematic for illustrating the subscriber termination module architecture in which the invention finds application; and FIG. 2 shows a state diagram.

In FIG. 1 a component ALAP (analog line audio processor) of a subscriber termination module which is allocated to two subscribers, and correspondingly is coupled to two interface components SLIC 0 and SLIC 1, which are responsible for the so-called BORSHT functions, that is for the supply (battery), over-voltage protection (over-voltage), the ringing supply (ringing), signalling supervision (supervision), the two-wire to four-wire conversion (hybrid), and the line testing (testing). Component ALAP in turn is responsible for the analog-digital conversion of speech into digital signals, limiting of the speech band in a PCM filter, as well as for the time slot allocation and furthermore represents the interface for signaling and setting data to a group control Ctr.

A subscriber group serves a plurality of subscribers, for example, 16, in which case 8 of components ALAP are present.

The method in accordance with the invention concerns the operation of interface circuits between group control Ctr as a central portion of a subscriber termination module and the components ALAP as local portions of this subscriber termination module.

Based on the type of operation in accordance with the invention only three lines are needed for the connection of the group control Ctr with a component ALAP by way of which all setting information and indication values for the indication of the respective appurtenant subscriber termination lines are transmitted.

These are the lines CS, DIO and DCLK. Line CS is an individual line leading to component ALAP. Under the precondition that seven further such component units are present within a subscriber termination module, as stated, seven further such lines CS are present. Lines DIO and DCLK are multiple lines which form a connection of control Ctr with further components ALAP, not shown.

In accordance with the invention these lines are used for the transmission of two types of different information. Line CS serves on the one hand in the transmission of setting information from control Ctr to component ALAP as a selectable line for one of the components ALAP coupled to Ctr and on the other hand for the transmission of indication information from component ALAP to control Ctr, which provide information on the line condition of the subscriber termination line.

In one case line DIO is utilized as a serial data line for data transmission from component ALAP, in another case it serves the transmission of status setting information which is provided by control Ctr and serves to interogate the individual line conditions of the subscriber termination lines involved.

Finally, line DCLK is alternatively utilized for the transmission of a clock signal for the above-mentioned serial data tranmission from component ALAP to control Ctr or nevertheless also for the transmission of status setting information from control Ctr to component ALAP.

The individual possible operating conditions will next be explained in greater detail with the aid of FIG. 2.

Status 0 which indicates the rest condition is characterized by the binary line condition combination CS=1; DIO=1; DCLK=1.

Departing from this rest condition status 1 can be reached by wayof the transition from CS=1 to CS=0, in which line DIO serves for the serial data transmission to component ALAP or as the case may be line DCLK serves for the transmission of the clock signal. Both lines represent in this condition a serial interface since they are placed in succession at the disposal of the individual components ALAP. which is achieved in that status 1 is set for the individual ones of these components in succession with CS=0.

A transistion from CS=0 to CS=1 causes a return to status 0, that is, the rest condition.

As is further shown in FIG. 2, two successions of states can be reached from status 0, namely status 2a through 2c or as the case may be status 3a through 3c.

Status 2a is reached through the transition of DIO=1 following DIO=0 with unchanged line conditions CS=1 and DCLK=1. In this state an interrogation takes place concerning the loop condition of the subscriber termination line coupled to the subscriber termination circuit SLIC 0 or, as the case may be, component unit ALAP. The corresponding loop condition signals are transmitted in this state by wayof line CS to control Ctr, in which case this line is thus utilized in accordance with the second alternative. Transmission of loop condition signals also takes place simultaneously by way of the remaining lines CS which provide a connection between control Ctr and components ALAP which are not shown, which signifies that a parallel interface is now realized.

If a change of state from DIO=0 to DIO=1 takes place from this state 2a on line DIO, then state 0 is again reached.

However, if the line condition combination determining state 2a changes to the effect that DCLK=1 changes to DCLK=0, then state 2b is reached, in which an interrogation takes place of the subscriber termination line coupled to the subscriber termination circuit SLIC 0 or as the case may be of all corresponding subscriber termination lines coupled to the remaining components ALAP with regard to the presence of an earth connection. In this case too, the corresponding earth connection signal is transmitted from component ALAP to control Ctr by way of line CS. A transition of the line condition DIO=0 to the line condition DIO=1 leads from this state to state 0.

State 2c is reached from state 2b through the line condition change from DIO=0 to DIO=1. Special supplemental information can be sent in this condition by way of line CS to control Ctr. Also from this condition, a jump can be made directly to state 0, by a change in line condition from DCLK=0 to DCLK=1.

The second series of states of state 3a through state 3c relates to corresponding interrogations and the provision of information in connection with the second subscriber allocated to component ALAP or as the case may be the corresponding subscriber termination circuit SLIC 1. State 3a is reached from state 0 by changing line condition DCLK=1 to DCLK=0. As shown in FIG. 2, the same line condition combinations DIO=0 and DCLK=0 occur for the selection of the line conditions of state 2b and state 3b. The discrimination as to which of the two conditions is correspondingly set up, depends on whether in the preceeding history of the setting of this line condition combination, departing from state 0 a condition change DIO=1 following DIO=0 had occurred or a line condition change of DCLK=1 to DCLK=0.

What is claimed is:

1. A method for the operation of interface circuits between a central portion and local portions of a subscriber termination module of a digital time multiplex telecommunication network wherein lines coupling the central portion and the local portions are selectively utilized on the one hand for transmission of information from the central portion to a respective local portion and on the other hand for transmission of information provided by the local portions simultaneously to the central portion as well as for transmission of status setting information to be likewise provided by the central portion to the local portions wherein, in said method, for providing for serial information transmission by which the central portion successively provides information to the local portions, those of said lines which are allocated individually to said local portions are utilized for transmission of information for selection of a corresponding local portion and those of said lines which are jointly provided for said local portions are utilized for said serial information transmission and lines jointly provided for transmission of state setting information to said local portions and lines individually provided for transmission of similar information to said central portion are utilized in the course of parallel information transmission wherein said local portions simultaneously provide said similar information to said central portion.

2. The method according to claim 1 wherein setting information transmitted to said local portions by way of said joint lines respectively appears in the form of combinations of distinguishable line potentials, taking account of the sequence of potential transitions in reaching said combinations of distinguishable line potentials.

* * * * *